United States Patent
Wu

(10) Patent No.: US 12,477,313 B2
(45) Date of Patent: Nov. 18, 2025

(54) MULTICAST BROADCAST SERVICE TRANSMISSION METHOD, MULTICAST BROADCAST SERVICE TRANSMISSION INDICATION METHOD, AND DEVICE

(71) Applicant: VIVO MOBILE COMMUNICATION CO., LTD., Dongguan (CN)

(72) Inventor: Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 506 days.

(21) Appl. No.: 17/953,300

(22) Filed: Sep. 26, 2022

(65) Prior Publication Data
US 2023/0021294 A1     Jan. 19, 2023

Related U.S. Application Data

(63) Continuation of application No. PCT/CN2021/082067, filed on Mar. 22, 2021.

(30) Foreign Application Priority Data

Mar. 27, 2020   (CN) .......................... 202010231297.8

(51) Int. Cl.
*H04W 8/18*       (2009.01)
*H04W 4/50*       (2018.01)
*H04W 72/0453*    (2023.01)

(52) U.S. Cl.
CPC ......... *H04W 4/50* (2018.02); *H04W 72/0453* (2013.01)

(58) Field of Classification Search
CPC ....... H04W 8/22; H04W 72/30; H04W 72/20; H04W 12/00; H04W 8/12; H04L 5/0048; H04L 63/20; H04L 51/046; H04B 7/0408
See application file for complete search history.

(56) References Cited

U.S. PATENT DOCUMENTS

| | | | |
|---|---|---|---|
| 2013/0229974 A1* | 9/2013 | Xu | ........................ H04W 4/06 370/312 |
| 2018/0110043 A1* | 4/2018 | Shi | ........................ H04L 5/0092 |
| 2020/0008130 A1 | 1/2020 | Yavuz et al. | |

FOREIGN PATENT DOCUMENTS

| CN | 101166174 A | 4/2008 |
|---|---|---|
| CN | 101400142 A | 4/2009 |
| CN | 101800942 A | 8/2010 |

(Continued)

OTHER PUBLICATIONS

International Search Report issued in corresponding International Application No. PCT/CN2021/082067, mailed Jun. 1, 2021, 5 pages.

(Continued)

*Primary Examiner* — Phuoc H Doan
(74) *Attorney, Agent, or Firm* — IPX PLLC

(57) ABSTRACT

A Multicast Broadcast Service (MBS) transmission method, an MBS transmission indication method, and a device are provided. The MBS transmission method includes: receiving first information from a network side; receiving an MBS or second information based on the first information, where the second information includes information about sending control of the MBS; and the first information is used to indicate one or more of the following: information about a sending frequency of the MBS; and information about a sending frequency of the second information.

20 Claims, 4 Drawing Sheets

(56) References Cited

FOREIGN PATENT DOCUMENTS

| CN | 102083004 A | 6/2011 |
|---|---|---|
| CN | 105992376 A | 10/2016 |
| WO | 2018082076 A1 | 5/2018 |

OTHER PUBLICATIONS

CATT, "MBMS Assistance Information from E-UTRAN.", 3GPP TSG RAN WG2 Meeting #77, R2-120259., Jan. 2012.
First Office Action issued in related Chinese Application No. 202010231297.8, mailed Sep. 1, 2022, 10 pages.

\* cited by examiner

MULTICAST BROADCAST SERVICE TRANSMISSION METHOD, MULTICAST BROADCAST SERVICE TRANSMISSION INDICATION METHOD, AND DEVICE

CROSS-REFERENCE TO RELATED APPLICATIONS

This application is a continuation of International Application No. PCT/CN2021/082067, filed on Mar. 22, 2021, which claims priority to Chinese Patent Application No. 202010231297.8, filed on Mar. 27, 2020. The entire contents of each of the above-identified applications are expressly incorporated herein by reference.

TECHNICAL FIELD

Embodiments of the present disclosure relate to the field of communications technologies, and in particular, to a multicast broadcast service transmission method, a multicast broadcast service transmission indication method, and a device.

BACKGROUND

In a conventional Long Term Evolution (LTE) technology, when a terminal receives a Multicast Broadcast Service (MBS), information about a working frequency of the terminal remains unchanged.

However, if a frequency on which the terminal receives an MBS is limited to a relatively narrow range of frequencies (for example, is kept within a frequency range that is the same as that for receiving common services), an MBS with a large data volume may occupy a large quantity of frequency resources, and consequently, a common service cannot be sent properly. If a frequency on which the terminal receives an MBS is limited to a relatively broad range of frequencies (for example, is kept within a frequency range that is the same as that for receiving common services), power consumption will become a problem for not only a terminal receiving an MBS (for example, a wide bandwidth is used when and where no MBS is received) but also a terminal receiving a common service.

Therefore, how to reasonably allocate frequency domain resources for MBSs is an urgent problem to be solved.

SUMMARY

A multicast broadcast service transmission method, a multicast broadcast service transmission indication method, and a device are provided.

According to a first aspect, the embodiments of the present disclosure provide an MBS transmission method, applied to a terminal and including:
  receiving first information from a network side;
  receiving an MBS or second information based on the first information, where
  the second information includes information about sending control of the MBS; and
  the first information is used to indicate one or more of the following: information about a sending frequency of the MBS; and information about a sending frequency of the second information.

According to a second aspect, the embodiments of the present disclosure further provide an MBS transmission indication method, applied to a network device and including:
  sending first information to a terminal, where
  the first information is used to indicate one or more of the following: information about a sending frequency of an MBS; and information about a sending frequency of second information, where the second information includes information about sending control of the MBS.

According to a third aspect, the embodiments of the present disclosure further provide a terminal, including:
  a first receiving module, configured to receive first information from a network side;
  a second receiving module, configured to receive an MBS or second information based on the first information, where
  the second information includes information about sending control of the MBS; and
  the first information is used to indicate one or more of the following: information about a sending frequency of the MBS; and information about a sending frequency of the second information.

According to a fourth aspect, the embodiments of the present disclosure further provide a network device, including:
  a sending module, configured to send first information to a terminal, where
  the first information is used to indicate one or more of the following: information about a sending frequency of an MBS; and information about a sending frequency of second information, where the second information includes information about sending control of the MBS.

According to a fifth aspect, the embodiments of the present disclosure further provide a communications device, including a processor, a memory, and a program stored in the memory and executable on the processor, where when the program is executed by the processor, steps of the MBS transmission method described in the first aspect are implemented; or steps of the MBS transmission indication method described in the second aspect are implemented.

According to a sixth aspect, the embodiments of the present disclosure further provide a computer-readable storage medium, where the computer-readable storage medium stores a computer program, and when the computer program is executed by a processor, steps of the MBS transmission method described in the first aspect are implemented; or steps of the MBS transmission indication method described in the second aspect are implemented.

BRIEF DESCRIPTION OF DRAWINGS

It becomes clear for those of ordinary skill in the art to learn various other advantages and benefits by reading detailed description of the following implementations. The accompanying drawings are merely used to show exemplary implementations, and are not considered as limitations to the present disclosure. In addition, in the accompanying drawings, the same reference symbol is used to represent the same component or part, unless otherwise indicated. In the accompanying drawings.

DETAILED DESCRIPTION

Figure 1:
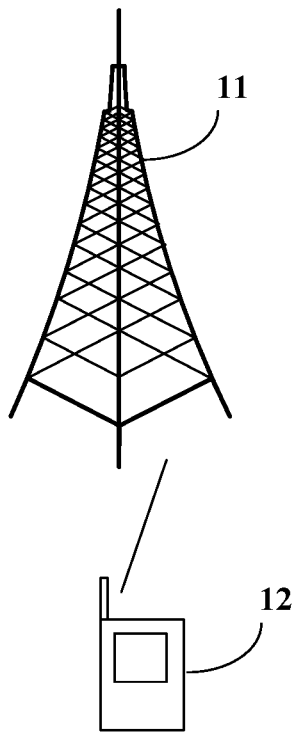
FIG. 1 is a schematic architectural diagram of a wireless communications system according to an embodiment of the present disclosure.

For ease of understanding embodiments of the present disclosure, two technical points are described below.

(1) A Brief Introduction of a Multimedia Broadcast and Multicast Service (MBMS) or a Multicast Broadcast Service (MBS):

In an LTE system, an MBMS may be sent in the following two manners:

Manner 1 of sending an MBMS/MBS: sending through a Physical Multicast CHannel (PMCH) in a subframe in a Multimedia Broadcast multicast service Single Frequency Network (MBSFN). In this manner, control information is sent by using system information (for example, SIB13) through a Multicast Control CHannel (MCCH), and data is sent through a Multicast Traffic CHannel (MTCH).

Manner 2 of sending an MBMS/MBS: sending through a Physical Downlink Shared CHannel (PDSCH) scheduled by a Physical Downlink Control CHannel (PDCCH). In this manner, control information is sent by using system information (for example, SIB20) through a Single Cell Multicast Control CHannel (SC-MCCH), and data is sent through a Single Cell Multicast Traffic CHannel (SC-MTCH). SC-MCCH is sent through a PDSCH scheduled by a Single Cell Radio Network Temporary Identifier (SC-RNTI) PDCCH, and SC-MTCH is sent by a PDSCH scheduled by a G-RNTI PDCCH.

(2) A Brief Introduction of a BandWidth Part (BWP):

For one specific cell, at most four BWPs may be configured by the network side, corresponding to different information about working frequencies. The network side may indicate an activated BWP by using Downlink Control Information (DCI). For one specific cell, the terminal can only have one activated BWP at a same moment.

The following describes the technical solutions in the embodiments of the present disclosure with reference to the accompanying drawings in the embodiments of the present disclosure. Apparently, the described embodiments are some rather than all of the embodiments of the present disclosure. All other embodiments obtained by those of ordinary skill in the art on the basis of the embodiments of the present disclosure without creative efforts shall fall within the protection scope of the present disclosure.

The term "include" and any other variants in the description and the claims of this application mean to cover the non-exclusive inclusion, for example, a process, method, system, product, or device that includes a list of steps or units, and is not necessarily limited to those steps or units that are expressly listed but may include other steps or units not expressly listed or inherent to such a process, method, product, or device. In addition, "and/or" used in the description and the claims means at least one of the connected objects. For example, A and/or B represents the following three cases: Only A exists, only B exists, and both A and B exist.

In the embodiments of the present disclosure, the term "exemplary", "for example", or the like is used to represent an example, an instance, or description. Any embodiment or design solution described as "exemplary" or "an example" in the embodiments of the present disclosure should not be construed as being more preferred or advantageous than other embodiments or design solutions. To be precise, the use of the term "exemplary", "for example", or the like is intended to present a related concept in a specific manner.

The technology described in this specification is not limited to a Long Term Evolution (LTE)/LTE-advanced (LTE-A) system, but can also be applied to various wireless communications systems, such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA) and other systems.

The terms "system" and "network" are often interchangeable in use. The CDMA system can implement radio technologies, such as CDMA2000 and Universal Terrestrial Radio Access (UTRA). UTRA includes Wideband Code Division Multiple Access (WCDMA) and another CDMA variation. The TDMA system can implement radio technologies, such as the Global System for Mobile communication (GSM). The OFDMA system can implement radio technologies, such as Ultra Mobile Broadband (UMB), Evolved UTRA (E-UTRA), IEEE802.11 (Wi-Fi), IEEE 802.16 (WiMAX), IEEE 802.20, and Flash-OFDM. UTRA and E-UTRA are parts of a Universal Mobile Telecommunications System (UMTS). LTE and advanced LTE (for example, LTE-A) are new UMTS versions that use E-UTRA. UTRA, E-UTRA, UMTS, LTE, LTE-A, and GSM are described in documents by an organization named "3rd Generation Partnership Project" (3GPP). CDMA2000 and UMB are described in documents by an origination named "3rd Generation Partnership Project 2" (3GPP2). The technologies described in this specification may also be used in the foregoing systems and radio technologies, and may further be used in another system and radio technology.

The embodiments of the present disclosure are described below with reference to the accompanying drawings. The multicast broadcast service transmission method and a device provided in the embodiments of the present disclosure may be applied to a wireless communications system. Refer to FIG. 1. FIG. 1 is a schematic architectural diagram of a wireless communications system according to an embodiment of the present disclosure. As shown in FIG. 1, the wireless communications system may include a network device 11 and a terminal 12. The terminal 12 may be denoted as UE 12, and the terminal 12 may communicate with the network device 11 (to transmit signaling or transmit data). In actual application, a connection between the foregoing devices may be a wireless connection. To represent a connection relationship between the devices, a solid line is used for illustration in FIG. 1.

The network device 11 provided in this embodiment of the present disclosure may be a base station, and the base station may be a commonly used base station, or may be an evolved Node Base station (eNB), or may be a device such as a network device (for example, a next generation Node Base station (gNB) or a Transmission and Reception Point (TRP)) in a 5G system.

The terminal 12 provided in this embodiment of the present disclosure may be a mobile phone, a tablet computer, a notebook computer, an Ultra-Mobile Personal Computer (UMPC), a netbook, a Personal Digital Assistant (PDA), a Mobile Internet Device (MID), a wearable device, a vehicle-mounted device, or the like.

Figure 2:
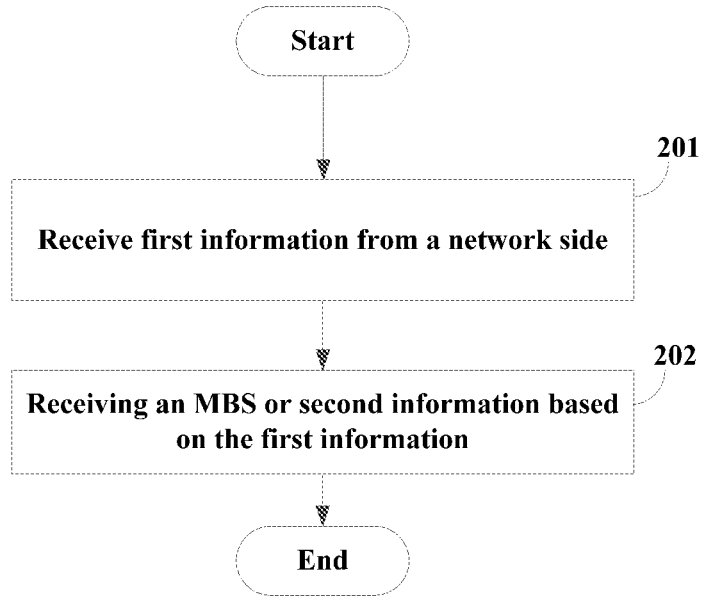
FIG. 2 is a flowchart of a multicast broadcast service transmission method according to an embodiment of the present disclosure.

Refer to FIG. 2. An embodiment of the present disclosure provides an MBS transmission method. The method is performed by a terminal and includes step 201 and step 202.

Step 201: receiving first information from a network side.

It can be understood that the first information may also be referred to as configuration information.

For example, the terminal may receive the first information from the network side in at least one of the following three manners:

Manner 1: receiving the first information from the network side by using system information, where the system information may be SIB13.

Manner 2: receiving the first information from the network side by using a dedicated RRC message, where the dedicated RRC message may be an RRC reconfiguration message used by the terminal in a connected mode to receive an MBS; or an RRC release message used by the terminal in an idle mode (IDLE) or an inactive mode (INACTIVE) to receive an MBS.

Manner 3: receiving the first information from the network side by using a control message of an MBS, where the control message of the MBS may be an MCCH control message, where for example, sending frequency information corresponding to the MBS is carried in the MCCH control message.

In some embodiments, the first information is used to indicate one or more of the following: (1) information about a sending frequency/sending frequencies of one MBS or a plurality of different MBSs in one cell; and (2) information about a sending frequency of second information, where the second information includes information about sending control of the MBS.

For example, sending frequency ranges of MBS1 and MBS2 that are in a cell 1 are BWP1 and BWP2 respectively. A sending frequency range of information about sending control of MBS1 is BWP1, and a sending frequency range of information about sending control of MBS2 is BWP2.

The information about sending control of the MBS may include at least one of the following: (1) a control message of the MBS, for example, a Radio Resource Control (RRC) message in an MCCH, a Media Access Control Control Element (MAC CE) for the MBS, or MBS system information (for example, SIB13); and (2) third information used to indicate a change of the control message of the MBS, where the third information may also be referred to as MBS control message change indication information, for example, indication information used to indicate a change of an RRC message in an MCCH (for example, MCCH change notification); or an MBS system information change indication.

It can be understood that, the third information sent within a sending frequency range indicated by one piece of sending frequency information may indicate a change of one or more control messages described above of the MBS.

The frequency information may also be referred to as a frequency range or a frequency range information.

In some embodiments, the frequency information may include at least one of the following: (1) a BWP identifier, for example, BWP-1; (2) a frequency point, for example, an Absolute Radio Frequency Channel Number (ARFCN); (3) a bandwidth, for example, 20 MHz; (4) a start of a frequency, for example, ARFCN-start; (5) an end of a frequency, for example, ARFCN-end; (6) a Physical Resource Block (PRB), for example, PRB-1; and (7) a quantity identifier of physical resource blocks, for example, 10 PRBs.

In some embodiments, an identifier of the MBS includes at least one of the following: (1) an MBS information identifier, for example, a Temporary Mobile Group Identity-1 (TMGI-1); (2) an MBS logical channel identifier, for example, MTCH-1; (3) an MBS bearer identifier, for example, Data Radio Bearer-1 (DRB-1) or an MBMS Point to Multipoint Radio Bearer-1 (MRB-1); (4) an MBS area identifier, for example, a Service Area Identifier (SAI); and (5) an MBS sending area identifier, for example, MBSFN-1, a list of cells for sending the MBS, or an area identifier of the MBS sent over radio (for example, an MBS area 1).

Step 202: receiving the MBS or the second information based on the first information.

For example, the information about a frequency on which the MBS and/or the information about a sending frequency of the second information are/is determined to be sent by the network side based on the first information; and the MBS and the second information is received based on the sending frequency information.

The MBS may include an MBS that the terminal is interested in. In this way, the terminal may determine, based on the first information, information about a sending frequency of the MBS that the terminal is interested in, and/or the terminal may determine, based on the first information, information about a sending frequency of second information related to the MBS that the terminal is interested in.

In other words, a plurality of different MBSs and MBS control information in one cell may be sent within different frequency ranges. In this way, the terminal may receive, within a specified frequency range, the MBS that the terminal is interested in, and/or receive, within a specified frequency range, control information corresponding to the MBS that the terminal is interested in and/or information about change notification of the control information.

In this embodiment of the present disclosure, the information about a sending frequency of the MB S and/or the information about a sending frequency of the second information may be different from information about a sending frequency of a common service.

Because a frequency on which the terminal receives an MBS is different from a sending frequency range of a common service, it can be avoided that an MBS with a large data volume may occupy a large quantity of frequency resources and consequently a common service cannot be sent properly.

In addition, the network side may help with power saving of the terminal, as the information about a frequency of the MBS and/or the information about a sending frequency of the second information are/is a relatively board frequency range, while a sending frequency of a common service is a relatively narrow frequency range. In this way, there will be less power consumption of the terminal receiving an MBS, for if a wide bandwidth is used when and where no MBS is received, more power of the terminal is consumed.

It can be understood that the receiving of the second information (or the information about sending control of the MBS) may include: receiving of initial control information and receiving of a control information change.

(1) Receiving of Initial Control Information

The terminal that is interested in receiving one or more specific MBSs receives, based on the first information in step 201, information about sending control of the MBSs within a sending frequency range of the information about sending control of the MBSs corresponding to the one or more specific MBSs.

For example, the terminal is interested in receiving TMGI-1. The terminal may find, by reading system information (for example, SIB15) or a dedicated configuration information (for example, an RRC Reconfiguration message or an RRC Release message) delivered by the network side, that there is a service TMGI-1 in BWP-1 that the terminal is interested in receiving. In this case, the terminal may first receive information about sending control of an MBS within a sending frequency range (for example, BWP-2) of the information about sending control of the MBS (for example, an MCCH message and/or SIB13) corresponding to the service TMGI-1. Within a sending frequency range corresponding to a specific MBS, the terminal receives, based on the sending frequency range that corresponds to the specific MBS and that is configured by using information about sending control of the MBS, the corresponding MBS.

In some embodiments, the second information may indicate (or configure) the information about the sending frequency of the MBS. In this way, after the second information is received based on the sending frequency information, the to-be-received MBS may be received based on information, indicated by the second information, about a sending frequency of the to-be-received MBS.

(2) Receiving of a Control Information Change

It can be understood that, in step 202, a manner of receiving, by the terminal, a control message of an MBS after a change is as follows: receiving the third information within a sending frequency range indicated by information about a sending frequency of the third information corresponding to the to-be-received MBS, where the third information indicates a change of the control message of the MBS corresponding to the to-be-received MBS; and receiving, within a sending frequency range indicated by information about a sending frequency of the control message of the MBS, a control message of the MBS that is after a change and that corresponds to the to-be-received MBS.

For example, the terminal receives, within a sending frequency range corresponding to MBS control message change indication information corresponding to the MBS that the terminal is interested in, the MBS control message change indication information. If the MBS control message change indication information indicates a change of a control message of the MBS corresponding to the MBS that the terminal is interested in, the terminal receives, within a sending frequency range corresponding to the control message of the MBS, the control message of the MBS corresponding to the MBS that the terminal is interested in.

Figure 4:
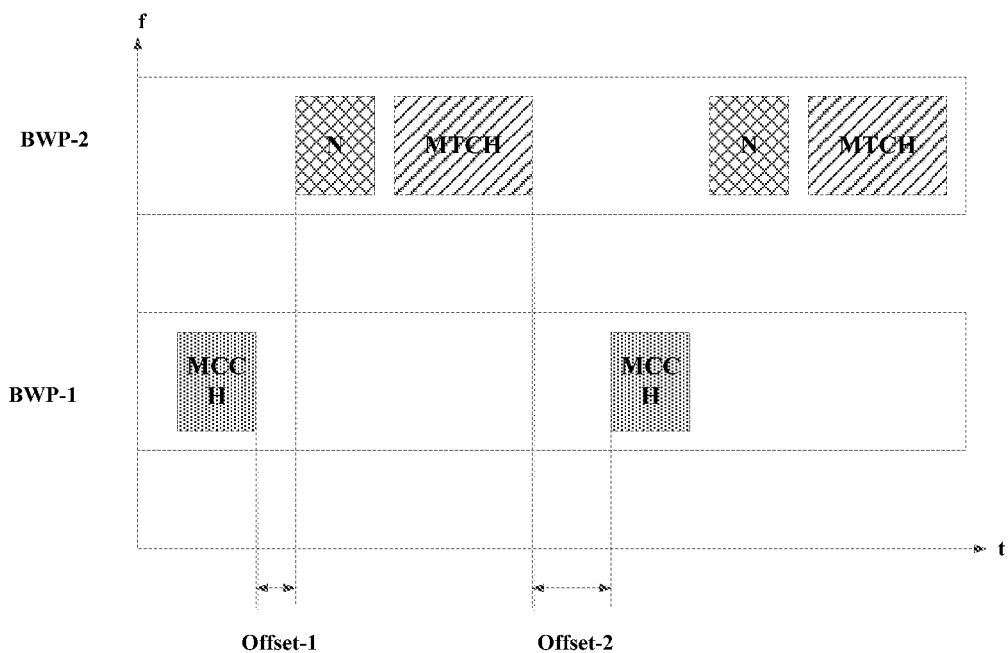
FIG. 4 is a schematic diagram of multicast broadcast service transmission according to an embodiment of the present disclosure.

Refer to FIG. 4. An MTCH of a service that the terminal is interested in is sent in BWP-2, and the terminal receives the MTCH of the service that the terminal is interested in BWP-2 after receiving, in BWP-1, an MCCH message of the service that the terminal is interested in. An update indication "N" of the MCCH message is sent in BWP-2. After receiving, in BWP-2, the update indication of the MCCH message, the terminal receives, in BWP-1, updated MCCH information, and then receives, in BWP-2, the MTCH of the service that the terminal is interested in.

In this embodiment of the present disclosure, the information about a sending frequency of the second information and the information about a sending frequency of the MBS are the same or different.

In some embodiments, that the information about a sending frequency of the second information and the information about a sending frequency of the MBS are the same or different is configured by the network side or agreed in a protocol. It can be understood that the network side configures a frequency range corresponding to the information about sending control of the MBS to be the same as or different from a frequency range corresponding to the specific MBS, or this is agreed in a protocol.

(1) The first information indicates the information about a sending frequency of the second information (or the information about sending control of the MBS), and it is agreed in a protocol that the information about a sending frequency of the MBS is the same as the information about a sending frequency of the second information.

For example, the network side configures the frequency range corresponding to the information about sending control of the MBS, and it may be agreed in the protocol that the information about a sending frequency of the MBS is the same as the frequency range corresponding to the information about sending control of the MBS.

(2) The first information indicates the information about a sending frequency of the MBS, and it is agreed in a protocol that the information about a sending frequency of the MBS is the same as the information about a sending frequency of the second information.

For example, the network side configures a frequency range corresponding to a specific MBS, and it is agreed in the protocol that the frequency range corresponding to the specific MBS is the same as the frequency range corresponding to the information about sending control of the MBS.

(3) The first information indicates the information about a sending frequency of the MBS and the information about a sending frequency of the second information, and the information about a sending frequency of the MBS is different from the information about a sending frequency of the second information.

For example, the network side configures a sending frequency range corresponding to a specific MBS, and further configures a frequency range corresponding to the information about sending control of the MBS, where the two frequency ranges may be different.

(4) The first information indicates the information about a sending frequency of the MBS and the information about a sending frequency of the second information, and it is agreed in a protocol that the information about a sending frequency of the second information is the same as the information about a sending frequency of the MBS.

For example, the network side configures a frequency range corresponding to the MBS control message change indication information, and further configures a frequency range according to a specific MBS, it is agreed in the protocol that the frequency range corresponding to the MBS control message change indication information is the same as the frequency range according to the specific MBS.

In this embodiment of the present disclosure, the information about a sending frequency of the third information and the information about a sending frequency of the control message of the MBS are the same or different.

In some embodiments, that the information about a sending frequency of the third information (or the MBS control message change indication information) and the information about a sending frequency of the control message of the MBS are the same or different is configured by the network side or agreed in a protocol.

For example, for the information about sending control of the MBS, the network side configures that a frequency range corresponding to the control message of the MBS to be the same as or different from the frequency range corresponding to the MBS control message change indication information, or this is agreed in a protocol.

(1) The first information indicates the information about a sending frequency of the control message of the MBS, and it is agreed in a protocol that the information about a sending frequency of the third information is the same as the information about a sending frequency of the control message of the MBS.

For example, the network side configures the frequency range corresponding to the control message of the MBS, and it is agreed in the protocol that the sending frequency range corresponding to the MBS control message change indication information is the same as the sending frequency range corresponding to the control message of the MBS.

(2) The first information indicates the information about a sending frequency of the third information, and it is agreed in a protocol that the information about a sending frequency of the third information is the same as the information about a sending frequency of the control message of the MBS.

For example, the network side configures the frequency range corresponding to the MBS control message change indication information, and it is agreed in the protocol that the sending frequency range corresponding to the control message of the MBS is the same as the sending frequency range corresponding to the MBS control message change indication information.

(3) The first information indicates the information about a sending frequency of the third information and the information about a sending frequency of the control message of the MBS, and the information about a sending frequency of the third information is different from information about a sending frequency of the control message of the MBS.

For example, the network side configures the sending frequency range corresponding to the control message of the MBS, and further configures the sending frequency range corresponding to the MBS control message change indication information, and the two sending frequency ranges may be different.

In this embodiment of the present disclosure, the method may further include: receiving fourth information from the network side, where the fourth information is used to indicate at least one of the following: (1) a corresponding relationship between the second information and the MBS; and (2) a corresponding relationship between the second information and the sending frequency information.

For example, in one specific cell, the network side may configure corresponding relationships between a plurality pieces of information about sending control of an MBS and the MBS.

For example, the network side may configure a plurality of different MCCH messages (or SIB13 messages) in a plurality of frequency ranges of one cell. The corresponding relationships include at least one of the following:

(1) One or more specific MBSs correspond to specific information about sending control of the MBS, where for example, TMGI-1 corresponds to a control message, of an MBS, on MCCH-1, and TMGI-2 and TMGI-3 correspond to a control message, of an MBS, on MCCH-2; and (2) One or more specific sending frequency ranges correspond to specific information about sending control of the MBS, where for example, BWP-1 corresponds to a control message, of an MBS, on MCCH-1, and BWP-2 and BWP-3 correspond to a control message, of an MBS, on MCCH-2.

MBS control message change indication information within one specific frequency range may indicate a change of one or more control messages of an MBS.

For example, the network side configures that MCCH-1 and MCCH-2 are used to send different control messages of an MBS. In this case, the MBS control message change indication information is sent in BWP-1.

A plurality of bits may be included in Downlink Control Information (DCI) on the Physical Downlink Control CHannel (PDCCH), and are used to indicate changes of different control messages of an MBS. For example, the first bit is set to "1", indicating a change of the control message of the MBS on MCCH-1, and the second bit is set to "1", indicating a change of a control message of an MBS on MCCH-2.

For example, the network side configures that SIB13 in BWP-1 and SIB13 in BWP-2 are used to send different control messages of an MBS. In this case, the MBS control message change indication information is sent in BWP-1.

A plurality of bits may be included in the DCI on the PDCCH or a paging message, and are used to indicate changes of different control messages of an MBS. For example, the first bit is set to "1", indicating a change of a control message, of an MBS, of SIB13 in BWP-1, and the second bit is set to "1", indicating a change of a control message, of an MBS, of SIB13 in BWP-2.

For example, the network side configures an initial BWP, where the initial BWP is used by the terminal to initiate a connection establishment when receiving and sending common data (for example, a Data Radio Bearer (DRB)). Further, the network configures a specific frequency range (for example, BWP-MBS) for receiving an MBS.

In the embodiments of the present disclosure, the network device may configure the MBS and/or the information about sending control of the MBS to be sent within different frequency ranges. In this way, the terminal can receive, within a corresponding frequency range, an MBS that the terminal is interested in and/or the information about sending control of the MBS. On one hand, there will be less power consumption of the terminal, accomplishing proper power saving. On the other hand, wide-bandwidth frequency resources in NR can be made full use.

Figure 3:
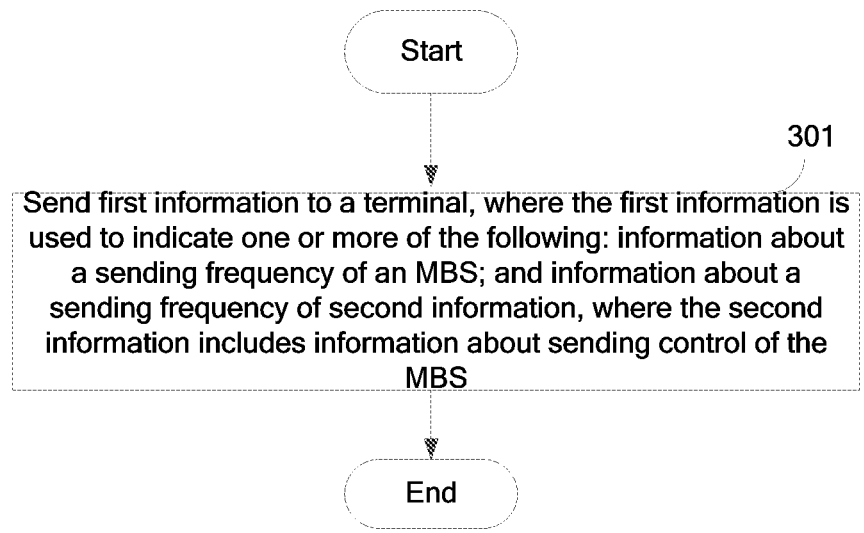
FIG. 3 is a flowchart of a multicast broadcast service transmission indication method according to an embodiment of the present disclosure.

Refer to FIG. 3. The embodiments of the present disclosure further provide an MBS transmission method. The method is performed by a network device and includes step 301.

Step 301: sending first information to a terminal, where the first information is used to indicate one or more of the following: (1) information about a sending frequency/sending frequencies of one MBS or a plurality of different MBSs in one cell; and (2) information about a sending frequency of second information, where the second information includes information about sending control of the MBS.

In this embodiment of the present disclosure, the information about a sending frequency of the MBS and/or the information about a sending frequency of the second information are/is different from information about a sending frequency of a common service.

For example, the network side configures an initial BWP, where the initial BWP is used by the terminal to initiate a connection establishment when receiving and sending common data (for example, a DRB). Further, the network configures a specific frequency range (for example, BWP-MBS) for receiving an MBS.

For example, the network device may send the first information to the terminal in at least one of the following three manners:

Manner 1: sending the first information by using system information, where the system information may be SIB13.

Manner 2: sending the first information by using a dedicated RRC message, where the dedicated RRC message may be an RRC reconfiguration message used by the terminal in a connected mode to receive an MBS; or an RRC release message used by the terminal in an idle mode (IDLE) or an inactive mode (INACTIVE) to receive an MBS.

Manner 3: sending the first information by using a control message of an MBS, where the control message of the MBS may be an MCCH control message, where for example, sending frequency information corresponding to the MBS is carried in the MCCH control message.

In some embodiments, the first information is used to indicate one or more of the following: (1) information about a sending frequency/sending frequencies of one MBS or a plurality of different MBSs in one cell; and (2) information about a sending frequency of second information, where the second information includes information about sending control of the MBS.

In this embodiment of the present disclosure, the information about a sending frequency of the second information and the information about a sending frequency of the MBS are the same or different.

The second information may also be referred to as information about sending control of an MBS. The second information may include at least one of the following: (1) a control message of the MBS, for example, an RRC message on an MCCH; a MAC CE for the MBS; or MBS system information (for example, SIB13); and (2) third information used to indicate a change of the control message of the MBS, for example, indication information used to indicate a change of an RRC message on an MCCH (for example, MCCH change notification); or an MBS system information change indication.

In this embodiment of the present disclosure, the information about a sending frequency of the third information and the information about a sending frequency of the control message of the MBS are the same or different.

In this embodiment of the present disclosure, the method further includes: if at least two of information about a sending frequency in the information about a sending frequency of the MBS, information about a sending frequency of the control message of the MBS, and information about a sending frequency of the third information are different from each other, sending at least two of the MBS, the control message of the MBS, and the third information separately at different time domain sending locations. In some embodiments, there is an offset between the different time domain sending locations.

For example, when at least two of a sending frequency range corresponding to a specific MBS, a sending frequency range corresponding to a control message of the MBS, and a sending frequency range corresponding to the MBS control message change indication information are different from each other, the network side may send any of an MBS, a control message of an MBS, or MBS control message change indication information that has a different sending frequency range separately at different time domain sending locations.

Further, there may be a specific offset between the different time domain sending locations. The offset is used to prevent loss of received information due to interruption of the terminal when a working frequency range changes.

Refer to FIG. 4. An MBS control message MCCH message, an MTCH for a specific MBS, and the MBS control message change indication information N are within different sending frequency ranges. In this case, the network side configures an offset offset-1 between receiving of the MCCH and receiving of N and an offset offset-2 between receiving of the MCCH and receiving of MTCH.

In the embodiments of the present disclosure, the network device may configure the MBS and/or the information about sending control of the MBS to be sent within different frequency ranges. In this way, the terminal can receive, within a corresponding frequency range, an MBS that the terminal is interested in and/or the information about sending control of the MBS. On one hand, there will be less power consumption of the terminal, accomplishing proper power saving. On the other hand, wide-bandwidth frequency resources in NR can be made full use.

Figure 5:
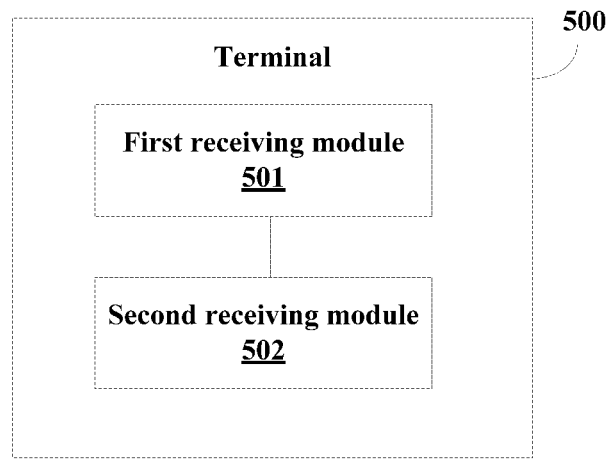
FIG. 5 is a schematic diagram of a terminal according to an embodiment of the present disclosure.

Refer to FIG. 5. The embodiments of the present disclosure further provide a terminal. The terminal 500 includes:

a first receiving module 501, configured to receive first information from a network side; and a second receiving module 502, configured to receive an MBS or second information based on the first information, where the second information includes information about sending control of the MBS.

The first information is used to indicate one or more of the following: (1) information about a sending frequency/sending frequencies of one MBS or a plurality of different MBSs in one cell; and (2) information about a sending frequency of the second information, where the second information includes information about sending control of the MBS.

In this embodiment of the present disclosure, for example, the second receiving module 502 is further configured to receive, based on information, indicated by the second information, about a sending frequency of a to-be-received MBS, the to-be-received MBS.

In this embodiment of the present disclosure, for example, the information about sending control of the MBS includes at least one of the following: (1) a control message of the MBS; and (2) third information used to indicate a change of the control message of the MBS.

In this embodiment of the present disclosure, for example, the third information sent within a sending frequency range indicated by one piece of sending frequency information indicates a change of one or more control messages described above of the MBS.

In this embodiment of the present disclosure, for example, the second receiving module 502 is further configured to: receive the third information within a sending frequency range indicated by information about a sending frequency of the third information corresponding to the to-be-received MBS, where the third information indicates a change of the control message of the MBS corresponding to the to-be-received MBS; and receive, within a sending frequency range indicated by information about a sending frequency of the control message of the MBS, a control message of the MBS that is after a change and that corresponds to the to-be-received MBS.

In this embodiment of the present disclosure, for example, the first receiving module 501 is further configured to receive the first information from the network side by using system information, a dedicated radio resource control message, or a control message of an MBS.

In this embodiment of the present disclosure, for example, the information about a sending frequency of the second information and the information about a sending frequency of the MBS are the same or different.

In this embodiment of the present disclosure, for example, that the information about a sending frequency of the second information and the information about a sending frequency of the MBS are the same or different is configured by the network side or agreed in a protocol.

In this embodiment of the present disclosure, for example, the first information indicates the information about a sending frequency of the second information, and it is agreed in the protocol that the information about a sending frequency of the MBS is the same as the information about a sending frequency of the second information; the first information indicates the information about a sending frequency of the MBS, and it is agreed in the protocol that the information about a sending frequency of the MBS is the same as the information about a sending frequency of the second information; the first information indicates the information about a sending frequency of the MBS and the information about a sending frequency of the second information, and it is agreed in the protocol that the information about a sending frequency of the MBS is different from the information about a sending frequency of the second information; or the first information indicates the information about a sending frequency of the MBS and the information about a sending frequency of the second information, and it is agreed in the protocol that the information about a sending frequency of the second information is the same as the information about a sending frequency of the MBS.

In this embodiment of the present disclosure, for example, the information about a sending frequency of the third information and the information about a sending frequency of the control message of the MBS are the same or different.

In this embodiment of the present disclosure, for example, that the information about a sending frequency of the third information and the information about a sending frequency of the control message of the MBS are the same or different is configured by the network side or agreed in a protocol.

In this embodiment of the present disclosure, for example, the first information indicates the information about a sending frequency of the control message of the MBS, and it is agreed in the protocol that the information about a sending frequency of the third information is the same as the information about a sending frequency of the control message of the MBS; the first information indicates the information about a sending frequency of the third information, and it is agreed in the protocol that the information about a sending frequency of the third information is the same as the information about a sending frequency of the control message of the MBS; or the first information indicates the information about a sending frequency of the third information and the information about a sending frequency of the control message of the MBS, and the information about a sending frequency of the third information is different from the information about a sending frequency of the control message of the MBS.

In this embodiment of the present disclosure, for example, the first receiving module 501 is further configured to receive fourth information from the network side, where the fourth information is used to indicate at least one of the following: a corresponding relationship between the second information and the MBS; and a corresponding relationship between the second information and the sending frequency information.

In this embodiment of the present disclosure, for example, the information about a sending frequency of the second information is different from information about a sending frequency of a common service.

The terminal according to this embodiment of the present disclosure may perform the foregoing method embodiment shown in FIG. 2. An implementation principle and a technical effect are similar to those in the method embodiment. Details are not described again in this embodiment.

Figure 6:
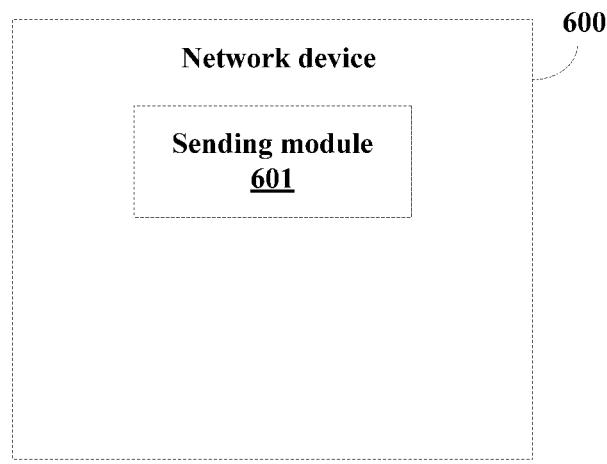
FIG. 6 is a schematic diagram of a network device according to an embodiment of the present disclosure.

Refer to FIG. 6. The embodiments of the present disclosure further provide a network device. The network device 600 includes:

a sending module 601, configured to send first information to a terminal, where the first information is used to indicate one or more of the following: (1) information about a sending frequency/sending frequencies of one MBS or a plurality of different MBSs in one cell; and (2) information about a sending frequency of second information, where the second information includes information about sending control of the MBS.

In this embodiment of the present disclosure, for example, the information about sending control of the MBS includes at least one of the following: (1) a control message of the MBS; and (2) third information used to indicate a change of the control message of the MBS.

In this embodiment of the present disclosure, for example, the third information sent within a sending frequency range indicated by one piece of sending frequency information indicates a change of one or more control messages described above of the MBS.

In this embodiment of the present disclosure, for example, the sending module 601 is further configured to: if at least two pieces of information about a sending frequency in the information about a sending frequency of the MBS, information about a sending frequency of the control message of the MBS, and information about a sending frequency of the third information are different from each other, send at least two of the MBS, the control message of the MBS, and the third information separately at different time domain sending locations.

In this embodiment of the present disclosure, for example, there is an offset between the different time domain sending locations.

The network device provided in this embodiment of the present disclosure may perform the foregoing method embodiment shown in FIG. 3. An implementation principle and a technical effect are similar to those in the method embodiment. Details are not described again in this embodiment.

Figure 7:
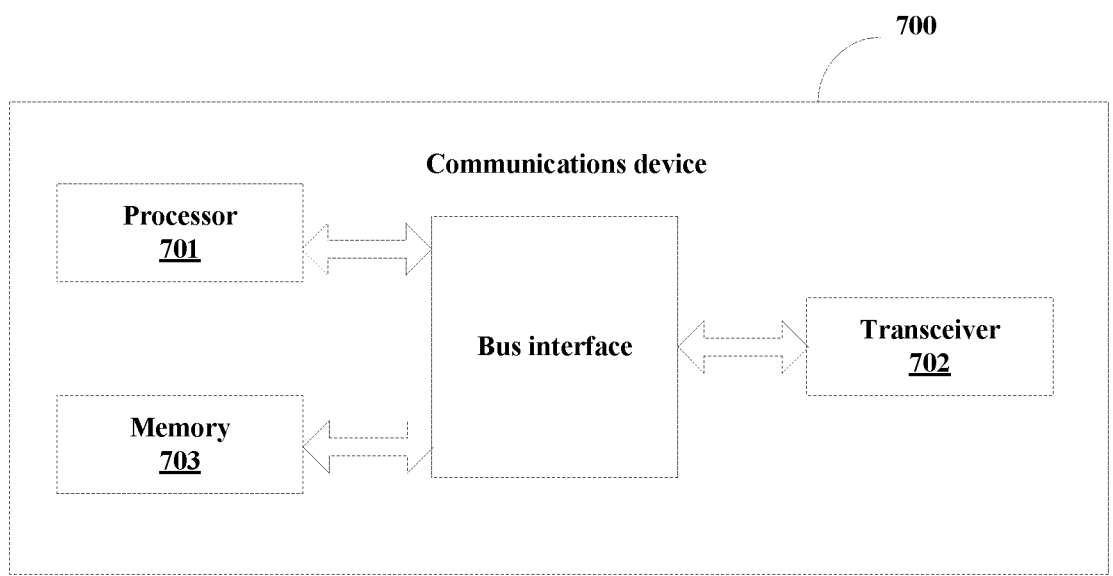
FIG. 7 is a schematic diagram of a communications device according to an embodiment of the present disclosure.

Refer to FIG. 7. FIG. 7 is a structural diagram of a communications device to which an embodiment of the present disclosure is applied. As shown in FIG. 7, the communications device 700 includes a processor 701, a transceiver 702, a memory 703, and a bus interface.

In one embodiment of the present disclosure, the communications device 700 further includes a computer program stored in the memory 703 and executable on the processor 701. When the computer program is executed by the processor 701, steps of the above embodiments in FIG. 2 or FIG. 3 are implemented.

In FIG. 7, a bus architecture may include any quantity of interconnected buses and bridges, and is specifically linked by various circuits of one or more processors represented by the processor 701 and a memory represented by the memory 703. The bus architecture may further link various other circuits, such as a peripheral device, a voltage regulator, and a power management circuit together. The bus interface provides interfaces. The transceiver 702 may include a plurality of elements, that is, include a transmitter and a receiver, and provide units for communication with various other apparatuses on a transmission medium. It can be understood that the transceiver 702 is an optional component.

The processor 701 is responsible for managing the bus architecture and common processing, and the memory 703 may store data used when the processor 701 performs an operation.

The communications device provided in this embodiment of the present disclosure may execute the foregoing method embodiment shown in FIG. 2 or FIG. 3, and an implementation principles and a technical effect thereof are similar. Details are not described herein again in this embodiment.

The method or algorithm steps described in combination with content disclosed in the present disclosure may be implemented by hardware, or may be implemented by a processor by executing software instructions. The software instruction may include a corresponding software module. The software module may be stored in a Random Access Memory (RAM), a flash memory, a Read-Only Memory (ROM), an Erasable PROM (EPROM), an Electrically EPROM (EEPROM), a register, a hard disk, a removable hard disk, a read-only optical disc, or any other form of storage medium well-known in the art. An exemplary storage medium is coupled to the processor, so that the processor can read information from the storage medium and can write information to the storage medium. Certainly, the storage medium may also be a component of the processor. The processor and the storage medium may be located in an Application Specific Integrated Circuit (ASIC). In addition, the ASIC may be located in a core network interface device. Certainly, the processor and the storage medium may exist in the core network interface device as discrete components.

Those skilled in the art should be aware that in the foregoing one or more examples, functions described in the present disclosure may be implemented by hardware, software, firmware, or any combination thereof. When implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any usable medium accessible to a general-purpose or dedicated computer.

The objectives, technical solutions, and beneficial effects of the present disclosure are further described in detail in the foregoing description of embodiments. It should be understood that the foregoing description is merely description of embodiments of the present disclosure, and are not intended to limit the protection scope of the present disclosure. Any modification, equivalent replacement, improvement, or the like made on the basis of the technical solutions of the present disclosure shall fall within the protection scope of the present disclosure.

Those skilled in the art should understand that the embodiments of the present disclosure can be provided as a method, a system, or a computer program product. Therefore, the embodiments of the present disclosure may be embodiments in a form of a complete hardware embodiment, a complete software embodiment, or an embodiment incorporating software and hardware aspects. Moreover, the embodiments of the present disclosure may use a form of a computer program product that is implemented on one or more computer-usable storage media (including but not limited to a magnetic disk memory, a CD-ROM, an optical memory, and the like) that include a computer-usable program code.

The embodiments of the present disclosure are described with reference to the flowcharts and/or block diagrams of the methods, devices (systems), and computer program products according to the embodiments of the present disclosure. It should be understood that each process and/or block in the flowchart and/or block diagram as well as a combination of processes and/or blocks in the flowchart and/or block diagram may be implemented by computer program instructions. These computer program instructions can be provided to a general-purpose computer, a dedicated computer, an embedded processor, or a processor of another programmable data processing device to generate a machine, so that an apparatus configured to implement functions specified in one or more procedures of a flowchart and/or one or more blocks of a block diagram is generated by using the instructions executed by the computer or the processor of the another programmable data processing device.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a function specified in one or more procedures of the flowchart and/or in one or more blocks of the block diagram.

These computer program instructions may also be loaded onto a computer or another programmable data processing device, so that a series of operation steps are performed on the computer or another programmable device to produce computer-implemented processing, thereby providing instructions executed on the computer or another programmable device to implement steps for the function specified in one or more processes of the flowchart and/or one or more blocks of the block diagram.

Obviously, those skilled in the art can make various modifications and variations to the embodiments of the present disclosure without departing from the spirit and scope of the present disclosure. In this way, the present disclosure is intended to include these modifications and variations to the embodiments of the present disclosure provided that these modifications and variations fall within the scope of the claims of the present disclosure and their equivalent technologies.

What is claimed is:

1. A Multicast Broadcast Service (MBS) transmission method, performed by a terminal, wherein the method comprises:
   receiving first information from a network side; and
   receiving an MBS or second information based on the first information, wherein:
      the second information comprises information about sending control of the MBS;
      the first information is used to indicate:
         information about a sending frequency of the MBS; and
         information about a sending frequency of the second information; and
      the information about sending control of the MBS comprises at least one of the following:
         a control message of the MBS; or
         third information used to indicate a change of the control message of the MBS.

2. The method according to claim 1, wherein after receiving the second information based on the first information, the method further comprises:
   receiving, based on information that is indicated by the second information and that is about a sending frequency of a to-be-received MBS, the to-be-received MBS.

3. The method according to claim 1, wherein the third information indicates a change of one or more control messages of the MBS.

4. The method according to claim 1, wherein the receiving second information based on the first information comprises:

receiving the third information within a sending frequency range indicated by information about a sending frequency of the third information corresponding to a to-be-received MBS, wherein the third information indicates the change of the control message of the MBS corresponding to the to-be-received MBS; and receiving, within a sending frequency range indicated by information about a sending frequency of the control message of the MBS, the control message of the MBS that is after the change and that corresponds to the to-be-received MBS.

5. The method according to claim 1, wherein the receiving first information from a network side comprises:
receiving the first information from the network side by using system information, a dedicated radio resource control message, or the control message of the MBS.

6. The method according to claim 1, wherein
the information about the sending frequency of the second information and the information about the sending frequency of the MBS are the same or different.

7. The method according to claim 6, wherein
that the information about the sending frequency of the second information and the information about the sending frequency of the MBS are the same or different is configured by the network side or agreed in a protocol.

8. The method according to claim 1, further comprising:
receiving fourth information from the network side, wherein the fourth information is used to indicate at least one of the following:
a corresponding relationship between the second information and the MBS; or
a corresponding relationship between the second information and the information about a sending frequency.

9. The method according to claim 1, wherein
the information about the sending frequency of the second information or the information about the sending frequency of the MBS is different from information about a sending frequency of a common service.

10. A Multicast Broadcast Service (MBS) transmission indication method, performed by a network device, wherein the method comprises:
sending first information to a terminal, wherein;
the first information is used to indicate:
information about a sending frequency of an MBS; and
information about a sending frequency of second information, wherein the second information comprises information about sending control of the MBS that comprises at least one of the following:
a control message of the MBS: or
third information used to indicate a change of the control message of the MBS.

11. The method according to claim 10, wherein the third information indicates a change of one or more control messages of the MBS.

12. The method according to claim 10, further comprising:
when at least two pieces of information about a sending frequency in the information about the sending frequency of the MBS, information about a sending frequency of the control message of the MBS, and information about a sending frequency of the third information are different from each other, sending at least two of the MBS, the control message of the MBS, and the third information separately at different time domain sending locations.

13. The method according to claim 12, wherein there is an offset between the different time domain sending locations.

14. A communications device, comprising:
a memory storing computer-readable instructions;
a processor coupled to the memory and configured to execute the computer-readable instructions, wherein the computer-readable instructions, when executed by the processor, cause the processor to perform operations comprising:
receiving first information from a network side; and
receiving an MBS or second information based on the first information, wherein;
the second information comprises information about sending control of the MBS;
the first information is used to indicate:
information about a sending frequency of the MBS; and
information about a sending frequency of the second information; and
the information about sending control of the MBS comprises at least one of the following;
a control message of the MBS; or
third information used to indicate a change of the control message of the MBS.

15. The communications device according to claim 14, wherein after the receiving second information based on the first information, the operations further comprise:
receiving, based on information that is indicated by the second information and that is about a sending frequency of a to-be-received MBS, the to-be-received MBS.

16. The communications device according to claim 14, wherein the third information indicates a change of one or more control messages of the MBS.

17. The communications device according to claim 14, wherein the receiving second information based on the first information comprises:
receiving the third information within a sending frequency range indicated by information about a sending frequency of the third information corresponding to a to-be-received MBS, wherein the third information indicates the change of the control message of the MBS corresponding to the to-be-received MBS; and
receiving, within a sending frequency range indicated by information about a sending frequency of the control message of the MBS, the control message of the MBS that is after the change and that corresponds to the to-be-received MBS.

18. The communications device according to claim 14, wherein the receiving first information from a network side comprises:
receiving the first information from the network side by using system information, a dedicated radio resource control message, or the control message of the MBS.

19. The communications device according to claim 14, wherein the information about the sending frequency of the second information and the information about the sending frequency of the MBS are the same or different.

20. The communications device according to claim 19, wherein:
that the information about the sending frequency of the second information and the information about the sending frequency of the MBS are the same or different is configured by the network side or agreed in a protocol.

* * * * *